3,795,658
EPOXY RESINS FROM DIMETHYLADAMANTANE BISPHENOLS
Robert M. Thompson, Wilmington, Del., and Irl N. Duling, West Chester, Pa., assignors to Sun Research and Development Co., Philadelphia, Pa.
No Drawing. Filed Dec. 30, 1971, Ser. No. 214,420
Int. Cl. C08g 30/04
U.S. Cl. 260—47 EP    5 Claims

ABSTRACT OF THE DISCLOSURE

Novel epoxy resins having the structure:

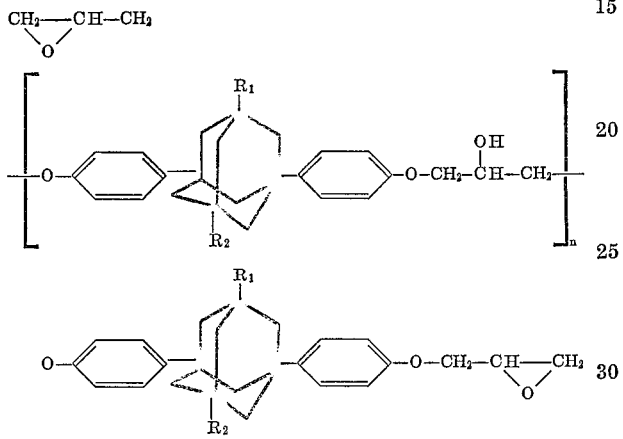

where $R_1$ and $R_2$ are hydrogen or hydrocarbyl radicals having 1 to 20 carbon atoms and $n$ represents the number of repeating units. These resins are valuable in the manufacture of coatings, molding resins, adhesives, potting and encapsulation applications and the like.

BACKGROUND OF THE INVENTION (1) Field of the invention

The present invention relates to epoxy resins wherein the repeating unit contains an adamantane bisphenol moiety.

(2) Description of the prior art

Epoxy resins have found considerable utility as components of thermosetting structural plastics and surface coatings. The typical preparation of epoxy resins involves the reaction of a dihydric phenol with an epoxy compound. For example, bisphenol A, 2,2-bis(4-hydroxyphenyl) propane, reacts with epichlorohydrin in the presence of an alkaline catalyst to form epoxy-terminated polyhydroxy ethers. Bisphenol A is the dihydric phenol used in most commercial epoxy resins. However, these epoxy resins shrink when they are cured. In potting and encapsulation applications, this linear shrinkage is a critical consideration. In addition to providing new and novel compositions of matter, the epoxy resins of this invention containing adamantane bisphenol moieties have minimum linear shrinkage upon curing compared with conventional epoxy resins.

SUMMARY

The invention embraces new compounds having the structure:

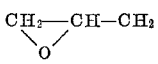

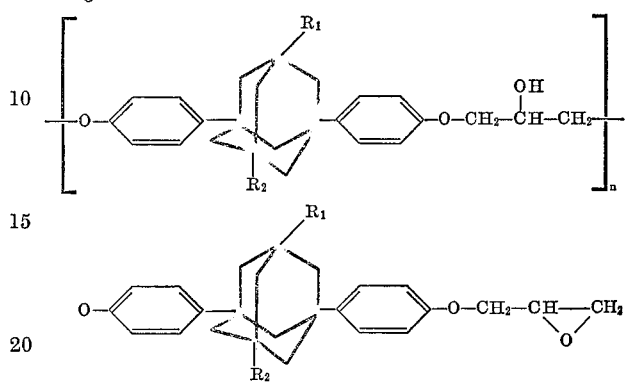

where $R_1$ and $R_2$ are hydrogen or hydrocarbyl radicals having 1 to 20 carbon atoms. The hydrocarbyl radicals can be selected from the group consisting of alkyl, cycloalkyl, aryl, alkaryl and aralkyl. These resins have excellent color, clarity, high temperature and high adhesion properties. They are useful in surface coatings, molding resins, adhesives and particularly as potting and encapsulating compounds.

DESCRIPTION OF THE PREFERRED EMBODIMENTS

The compounds of the invention can be prepared from adamantane bisphenol of the structure:

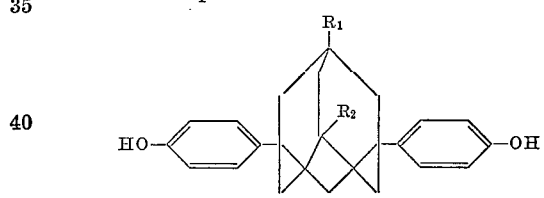

where $R_1$ and $R$ have the significance previously given and epichlorohydrin. A preferred procedure comprises reacting the adamantane bisphenol and epichlorohydrin in the presence of an alkaline catalyst such as sodium hydroxide. The mixture is stirred and heated to about 95° C. The resulting exothermic reaction must be controlled, so that the temperature is maintained between 95° and 100° C. by cooling and adding additional portions of catalyst. After the reaction is completed, the excess epichlorohydrin is distilled off. The reaction mixture is allowed to cool and an organic solvent is added to precipitate the salt present. The salt is filtered and washed with additional organic solvent. The solvent solution and washings are combined; the solvent is removed by distillation and the resin is recovered.

Generally, a stoichiometric ratio of adamantane bisphenol to epichlorohydrin is employed although it is sometimes desirable to use an excess of epichlorohydrin. Reaction conditions of temperature and pressure may vary over a wide range. For example, operable temperatures range between 75° C. and 100° C. and preferably between 85° C. and 100° C. Similarly, the pressure may range from subatmospheric 40 mm. Hg to superatmospheric 2000 mm. Hg, but preferably from 50 to 780 mm. Hg.

The polymers of the present invention have molecular weights in the range of 460 to 8520. This corresponds to $n=1$ to about 20. The lower molecular weight polymers are generally referred to as epoxy resins ($n=0$ to about 9). Phenoxy resins are high molecular epoxy resins. The inherent viscosity is indicative of the molecular weight or the degree of polymerization and is used herein as a measure thereof. Inherent viscosity is represented by the equation:

$$\eta_{inherent} = \ln \frac{\eta_{relative}}{C}$$

where $\eta_{relative} = t/t_0$ $t_0$ = flow time through a viscometer of a liquid reference $t$ = flow time through the same viscometer of a dilute solution of a polymer in the reference liquid $C$ = concentration of polymer in solution expressed in grams/deciliter The molecular weights of the epoxy resins of bisphenol adamantane are generally too low to measure by solution viscosity methods. In these cases, it is preferable to use vapor pressure osmometry. Higher molecular weight phenoxy resins of bisphenol adamantanes can be produced according to this invention by the reaction of the low molecular weight epoxy resins with adamantane bisphenol in the presence of alkaline catalyst like lithium hydroxide. Lower epoxy resins derived from adamantane bisphenols having molecular weights ranging from about 460 to 866 are used in the reaction. It is preferred, however, to employ lower epoxy resins having molecular weights ranging from about 460 to 650 since these lower molecular weight resins are more easily obtained free from the salt and other by-products of manufacture. The lower the molecular weight the less the resin has to be processed through purification steps because it is easier to separate the impurities. Depending on the ratio of adamantane bisphenol to the lower molecular epoxy resin employed, phenoxy resins with molecular weights from about 30,000 to 55,000 (epoxy content of 0.003 to 0.002 epoxide equivalents) have been readily obtained. Epoxy equivalent is herein defined as the average number of 1,2-epoxy groups:

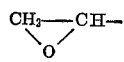

per 100 grams of epoxy resin.

The adamantane bisphenols used as starting materials have the structure:

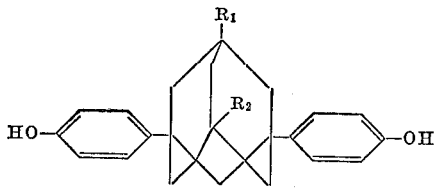

where $R_1$ and $R_2$ are radicals having 0 to 20 carbon atoms selected from the group consisting of hydrogen and hydrocarbyl. The term hydrocarbyl as used herein describes a monovalent hydrocarbon radical. Such hydrocarbyl radicals can be selected from the group consisting of alkyl, cycloalkyl, aryl, alkaryl and aralkyl.

A preferred structure is one in which at least one of $R_1$ and $R_2$ is a hydrocarbyl radical and most preferred is one where both $R_1$ and $R_2$ are hydrocarbyl radicals having 1 to 20 carbon atoms. Although the number of carbon atoms in each substituent radical can range from 0 up to 20, it is generally preferred that each of $R_1$ and $R_2$ contain no more than 10 carbon atoms. Most preferred are $R_1$ and $R_2$ selected from the group consisting of methyl and ethyl, because of the ease with which 1,3-dimethyl- and 1,3-diethyladamantane are obtained.

The adamantane bisphenols are described in commonly assigned U.S. application, Ser. No. 802,661, filed Feb. 26, 1969 by Robert E. Moore entitled Adamantane Bisphenols and now U.S. Pat. No. 3,594,427, issued July 20, 1971, and are prepared by reacting a compound of the structure:

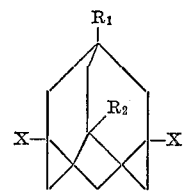

where $R_1$ and $R_2$ are as previously described and X is independently selected from the group consisting of bromo and chloro with an excess of phenol at a temperature in the range of 125° to 200° C. The reaction time for preparing the bisphenols will vary, particularly in regard to the temperature employed, from 4 to 10 hours. In practice, the preferred procedure is to carry out the reaction at a reflux which is around 178° to 185° C. (B.P. phenol 182° C.). At reflux, the reaction requires 5 to 7 hours for good yields. No catalyst is required. The reaction takes place in an excess of phenol which also serves as the solvent for the adamantane reactant and the product. The adamantane bisphenol is most easily recovered by cooling the reaction mixture and pouring it into warm water (66° to 80° C.) thus precipitating the bisphenol and dissolving the phenol. The crystalline material is filtered and recrystallized, for example, from xylene, toluene or isopropanol-water.

The adamantane hydrocarbons are well known and their preparation is adequately described in the literature. The dihalo derivatives can be prepared by reacting the coresponding adamantane hydrocarbon with chlorine or bromine in the presence of $AlCl_3$ or $AlBr_3$ as disclosed in Stetter and Wulff, German Pat. No. 101,410 and Stetter in Angew. Chem. International Edit., vol. 1 (1962), No. 6, pp. 287–288. The mixed bromo-chloroadamantane can be obtained by reacting a dibromo adamantane with a chlorine donor such as carbon tetrachloride in the presence of a Lewis acid catalyst as shown in the copending application of Robert E. Moore, Ser. No. 668,679, filed Dec. 7, 1967.

Examples of such suitable reactants to prepare the adamantane bisphenols are the bridgehead dichloro, dibromo or bromo-chloro derivatives of the following hydrocarbons:

adamantane;
1-methyladamantane;
1-ethyladamantane;
1,3-dimethyladamantane;
1-methyl-3-ethyladamantane;
1,3-dimethyladamantane;
1-methyl-3-ethyladamantane;
1,3-diethyladamantane;
1-n-propyladamantane;
1-isopropyladamantane;
1-n-butyladamantane;
1,3-di-n-pentyladamantane;
1-methyl-3-heptyladamantane;
1-n-decyladamantane;
1-n-decyl-3-ethyladamantane;
1-methyl-3-propyladamantane;
1-isohexyladamantane;
1-methyl-3-cyclohexyladamantane;
1-phenyladamantane;
1-methyl-3-phenyladamantane;
1,3-diphenyladamantane;
1-p-tolyladamantane;
1-benzyladamantane; and the like.

In the following examples, inherent viscosities ($\eta_{inh}$) were obtained at a concentration of 0.5 g./dl. at 100° F. in the indicated solvent. Number average molecular weight were determined by vapor pressure osmometry. The glass transition temperature was determined on Perkin-Elmer differential scanning calorimeter Model DSC–1B. The polymer configuration was determined by nuclear magnetic resonance and X-ray scan.

The invention is further illustrated by the following examples.

EXAMPLE I

Epoxy resin of bisphenol dimethyladamantane

In a 500 cc. resin kettle equipped with stirrer, thermometer and condenser was placed a mixture of 70 g. of bisphenol dimethyladamantane, 185 ml. of epichlorohydrin and 1 ml. water. A total of 16.4 g. of solid sodium hydroxide was added in a 2.6 g. portion during the reaction. The first portion was added and the mixture was heated with stirring to 95° C. at which time the reaction started. The reaction was kept between 95° and 100° C. by adding the additional portions of sodium hydroxide and cooling with an ice bath. After the last addition and after the exothermic reaction subsided, the excess epichlorohydrin was distilled at a pressure of 50 mm. Hg until the pot temperature reached 150° C. The residue was allowed to cool, then 60 cc. of benzene was added to precipitate the salt present. The salt was removed by vacuum filtration and washed with two additional 60 cc. portions of benzene. The benzene solution and washings were combined and the benzene distilled. When the pot temperature reached 170° C., a vacuum of 25 mm. Hg was applied and the distillation was continued until the pot temperature reached 170° C. The resulting highly viscous liquid was poured into an aluminum tray and then cooled with Dry Ice, so it could be broken into chips. Sixty grams of resin were obtained. The resin, Durran M.P.=47° C., had an average molecular weight of 550 by vapor phase osmometry in tetrahydrofuran. The epoxy equivalent weight was determined to be 296 by back titrating an acidified pyridine-resin solution.

EXAMPLE II

Phenoxy resin of bisphenol dimethyladamantane

A mixture of 16 g. of the epoxy resin of Example I and 10 g. of bisphenol dimethyladamantane were placed in a small resin kettle equipped with stirrer and $N_2$ inlet tube. About 0.0002 g. of LiOH was then added and the mixture subsequently heated to 190° C. in an oil bath under an atmosphere of nitrogen with stirring. After 4½ hours, the mixture was cooled and the polymer chipped out of the kettle. The light yellow polymer had an inherent viscosity ($\eta_{inh}$) equal to 0.14, the average molecular weight by vapor phase osmometry in tetrahydrofuran was 2221 and a glass transition temperature (Tg) of 135° C.

EXAMPLE III

Phenoxy resin using monosodium bisphenol dimethyladamantane

To a single neck flask equipped with a reflux condenser was added $5 \times 10^{-4}$ moles of the monosodium salt of bisphenol dimethyladamantane (prepared in situ) from a 1.00 M NaOH solution and the bisphenol dimethyladamantane followed by evaporation (under vacuum), 5.9 g. epoxy resin of bisphenol dimethyladamantane of Example I, 3.31 g. of the bisphenol dimethyladamantane and 40 cc. of purified acetophenone. The reaction flask was placed in a 100° oil bath for 5 days. The mixture was cooled, diluted with tetrahydrofuran and washed with water. The solution was then dried over $MgSO_4$ and after filtering, the tetrahydrofuran and acetone-phenone were removed by distillation, the latter at reduced pressures. Six grams of product were obtained. It was cooled and broken in chips. The product had an inherent viscosity ($\eta_{inh}$) of 0.17 (in tetrahydrofuran).

Both the epoxy and phenoxy resins derived from adamantane bisphenols may be cured or hardened with the conventional hardening and curing agents employed in the epoxy art. For example, polyfunctional primary and secondary amines, $BF_3$-amine complexes, tertiary amines and dibasic acids or acid anhydrides may be used as curing agents. Some useful curing agents are ethylene diamine, diethylene triamine, triethylene tetraamine, triethyl amine and $BF_3$-methylamine complexes. The acid anhydrides like phthalic anhydride, maleic anhydride, hexahydrophthalic anhydride, pyromellitic anhydride and mellophanic dianhydride are preferred. The cured resins of this invention are infusible and insoluble products with outstanding high temperature properties.

As an additional benefit, linear shrinkage of these resins after curing is minimized. This is a critical property for potting and encapsulation applications. If desired, organic and inorganic fillers and anti-settling agents, resinous modifiers and diluents may be employed without changing the composition of matter within the meaning of this invention.

The following table compares the bisphenol dimethyladamantane derived resin with a typical epoxy resin of the approximate epoxy equivalent weight derived from bisphenol A. Both resins were cured under similar conditions using phthalic anhydride. The heat distortion temperature (HDT) of the bisphenol dimethyladamantane resin was found to be at least seven degrees higher than the typical resin. The linear shrinkage of the resin of this invention is considerably better than the conventional resin. The thermal weight loss is indicative of curing agent loss rather than degradation of the resin.

TABLE

Properties of bisphenol DMA and bisphenol A epoxy resins cured with phthalic anhydride at 180° for 4 hours

|  | Bisphenol DMA resin |  | | Bisphenol A resin |
| --- | --- | --- | --- | --- |
| Melting point (° C.) a (Durran) | 47 | | | Liquid |
| Molecular weight a (vapor pressure osmometry) | 550 | | | 500 |
| A/E b | .6 | .7 | .85 | .7 |
| Hardness, Rockwell M | | | 100 | 100 |
| Heat-distortion temperature, ° C | 111 | 106 | 100 | 104 |
| Weight loss–heat aging 200° C. for 20 hr. (percent) | 0.5 | 0.89 | | 0.5 |
| Linear shrinkage | 0 | .75 | .75 | 2 | a Before curing.
b A/E ratio of anhydride equivalent to epoxide equivalent.

Pursuant to the requirements of the patent statutes, the principle of this invention has been explained and exemplified in a manner so that it can be readily practiced by those skilled in the art, such exemplification including what is considered to be the best embodiment of the invention. However, it should be clearly understood, that within the scope of the appended claims, the invention may be practiced by those skilled in the art and having the benefit of this disclosure otherwise than as specifically described and exemplified herein.

The invention claimed is:

1. A solid polymer having the structural formula:

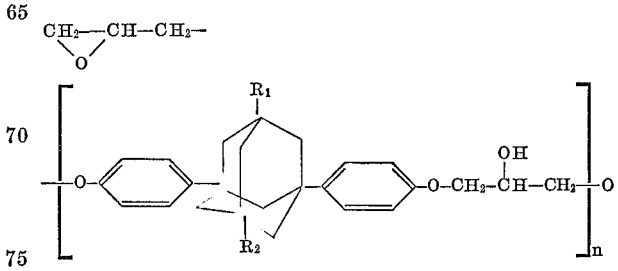

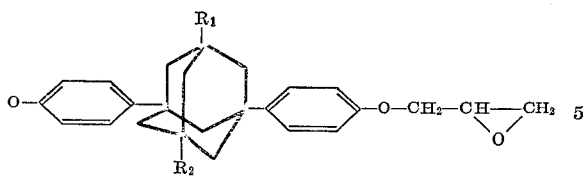

where $R_1$ and $R_2$ are independently selected from the group consisting of hydrogen, methyl, ethyl, propyl, isopropyl, butyl, pentyl, isohexyl and heptyl, $n$ represents the number of repeating units and $n$ is an integer in the range of 1 to 20.

2. The composition according to claim 1 wherein $R_1$ and $R_2$ are selected from the group consisting of methyl and ethyl.

3. The composition according to claim 2 wherein $R_1$ and $R_2$ are methyl.

4. The polymer according to claim 1, which has been cured by a curing agent, wherein the curing agent is selected from the group consisting of polyfunctional primary and secondary amines, tertiary amines, dibasic acids and dibasic acid anhydrides.

5. The cured polymer of claim 4 wherein the dibasic acid anhydride is phthalic anhydride.

References Cited

UNITED STATES PATENTS

| | | | |
|---|---|---|---|
| 3,594,427 | 7/1971 | Moore | 260—619 |
| 3,536,734 | 10/1970 | Vegter | 260—348.6 |
| 3,520,848 | 7/1970 | Delius et al. | 260—47 |

WILLIAM H. SHORT, Primary Examiner

T. E. PERTILLA, Assistant Examiner

U.S. Cl. X.R.

117—161 ZB; 260—47 EN, 47 EA, 348 C